United States Patent [19]

Paz

[11] Patent Number: 5,020,906
[45] Date of Patent: Jun. 4, 1991

[54] BORESIGHT MODULE

[75] Inventor: Ofer Paz, Jerusalem, Israel

[73] Assignee: Aryt Optronics Industries Ltd., Jerusalem, Israel

[21] Appl. No.: 411,413

[22] Filed: Aug. 16, 1989

[30] Foreign Application Priority Data

Aug. 28, 1988 [IL] Israel .................................. 87577

[51] Int. Cl.⁵ ............................................ G01B 11/26
[52] U.S. Cl. ................................ 356/138; 350/171; 350/622; 356/153
[58] Field of Search ................ 356/138, 153; 250/341; 350/622, 171; 33/234

[56] References Cited

U.S. PATENT DOCUMENTS

| 4,422,758 | 12/1983 | Godfrey et al. | 356/138 |
| 4,639,082 | 1/1987 | Loy | 356/138 |
| 4,649,274 | 3/1987 | Hartmann | 250/341 |

OTHER PUBLICATIONS

SPIE vol. 645 Optical Manufacturing, Testing, and Aspheric Optics (1986) by Rudolf Hartmann, pp. 116–119.

Primary Examiner—F. L. Evans
Attorney, Agent, or Firm—Darby & Darby

[57] ABSTRACT

A boresight module comprising a housing defining an optical axis and having a day optical window and a night optical window; a source of sensible radiation located along the optical axis; a collimator mounted in association with the housing operative to receive beams of radiation emitted by the radiation source and to reflect the beams parallel to the optical axis; and an optical assembly made from a single piece of material mounted within the housing and comprising first and second optical surfaces in respective optical association with the day and night optical windows and positioned so as to receive the reflected beams such that a first plurality of the beams is deflected by the first optical surface through the day optical window and a second plurality of the beams is deflected by the second optical surface through the night optical window.

19 Claims, 2 Drawing Sheets

BORESIGHT MODULE

FIELD OF THE INVENTION

The present invention relates generally to electro-optical systems employing day and night tracking or aiming systems and, particularly, to boresight modules used in association therewith.

BACKGROUND OF THE INVENTION

Laser-guided weapons delivery systems include, inter alia, a direct-view optical telescope or 'day'system used for daytime viewing and a thermal imaging or 'night-'system used for nighttime 'viewing'. The day system is useful for viewing targets located remote from the system and is operative, via electro-optical systems, to facilitate aiming of the weapons system with which it is associated.

The thermal imaging system, used for facilitating aiming of the weapons system at night, is operative to 'lock in' to thermal energy, typically infrared, emitted by the target. The thermal imaging system is mounted onto the optical telescope system such that the line of sight thereof is parallel to the line of sight of the thermal imaging system. The aligning of the line of sight of the thermal imaging system with that of the optical telescope system is known as 'boresighting.'

In order to carry out boresighting, apparatus, whose use is well known to those skilled in the art, has been developed which employs an optical subsystem, removably mounted in association with the optical telescope system and the thermal imaging system. This optical subsystem is known as a boresight module.

A conventional boresight module typically comprises an aluminum housing having 'day' and 'night' optical windows and in which there is disposed an elongate quartz prism disposed along an axis and defining first and second parallel reflective surfaces transversely intersecting the axis and respectively associated with the day and night windows, a light source, a collimator for reflecting parallel to the axis nonparallel light rays projected at the collimator and a reticle, which is typically a movable arrangement of cross hairs.

Light rays are projected past the cross hairs and pass to the collimator and, as stated, are reflected therefrom parallel to the axis. If the collimator is not arranged along the axis then there is also provided a compensating prism to cause reflection of the rays parallel to the axis. The quartz prism is arranged such that some of the light rays are projected through the day window and some are projected through the night window.

The module is mounted in association with the optical telescope system and the thermal imaging system such that the respective day and night windows are aligned therewith and such that light rays projected through each of the windows pass into the respective optical system associated therewith. By techniques which are not the subject of the present invention, boresighting may thus be carried out.

As will be appreciated by those skilled in the art, precise alignment between the reflective surfaces and the collimator is crucial in weapons systems employing the above-described optical systems, an acceptable angular line of sight error in boresighting being typically in the order of one half of a degree or less.

A disadvantage of the above-described boresight module is that alignment errors may result from differential thermal expansion of different portions of the quartz prism and the aluminum housing in which it is located. Although the prism is generally mounted in the housing by kinematic mounts, it has been found that significant angular line of sight errors nonetheless occur, these errors being due, at least in part, to differential thermal expansion between opposing ends of the prism.

Disclosed in an article in SPIE Vol. 645 Optical Manufacturing, Testing and Aspheric Optics (1986) by Rudolf Hartmann and, (at the time of publication of the article) a subject of a patent application by the U.S. Army, Invention Ser. No. 07/411,413, is a boresight module constructed so as to eliminate differential thermal expansion of optical elements employed therein.

The boresight module to Hartmann comprises an elongate hollow prismatic element onto ends of which are molecularly bonded respective beamsplitter and annular reflecting plates, these plates being nominally parallel to each other and being associated with respective day and night optical windows as described above.

Among disadvantages inherent in the module described in the article by Hartmann is that, in order to eliminate differential thermal expansion, the reflecting plates are molecularly bonded onto the prismatic element. This adds significant time and expense to the manufacturing process. In addition, both the conventional boresight module as described earlier and that described by Hartmann constitute complex structures having relatively large numbers of components.

SUMMARY OF THE INVENTION

It is an aim of the present invention to provide a boresight module which minimizes angular line of sight errors resulting from differential thermal expansion of components of the module.

It is also an aim of the present invention to provide a boresight module which, while substantially eliminating line of sight errors due to differential thermal expansion, does not necessitate molecular bonding of optical components to support elements to achieve this.

It is yet a further aim of the invention to provide a boresight module which has relatively few components when compared with conventional boresight modules.

There is provided, therefore, in accordance with an embodiment of the invention, a boresight module comprising a housing defining an optical axis and having a day optical window and a night optical window; a source of sensible radiation located along the optical axis; a collimator mounted in association with the housing operative to receive beams of radiation emitted by the radiation source and to reflect the beams parallel to the optical axis; and an optical assembly made from a single piece of material mounted within the housing and comprising first and second optical surfaces in respective optical association with the day and night optical windows and positioned so as to receive the reflected beams such that a first plurality of the beams is deflected by the first optical surface through the day optical window and a second plurality of the beams is deflected by the second optical surface through the night optical window.

Additionally in accordance with an embodiment of the invention, there is also provided a reticle located along the optical axis and positioned such that the emitted radiation beams are projected therepast prior to being received by the collimator.

Further in accordance with an embodiment of the invention, the optical assembly is made from aluminum and the first and second optical surfaces comprise diamond-machined surfaces.

In accordance with an alternative embodiment of the invention, there is provided an optical assembly suitable for use in a boresight module and being formed of a single piece of material and comprising first and second optical surfaces aligned along an optical axis such that of a number of sensible radiation beams projected thereat, a first plurality is deflected by the first optical surface and a second plurality is deflected by the second optical surface.

Additionally in accordance with the alternative embodiment of the invention, the single piece of material is a single piece of aluminum alloy and the first and second optical surfaces comprise diamond-machined surfaces.

BRIEF DESCRIPTION OF THE DRAWINGS

The present invention will be understood and appreciated more fully from the following detailed description, taken in conjunction with the drawings, in which.

DETAILED DESCRIPTION OF A PREFERRED EMBODIMENT

Figure 1:
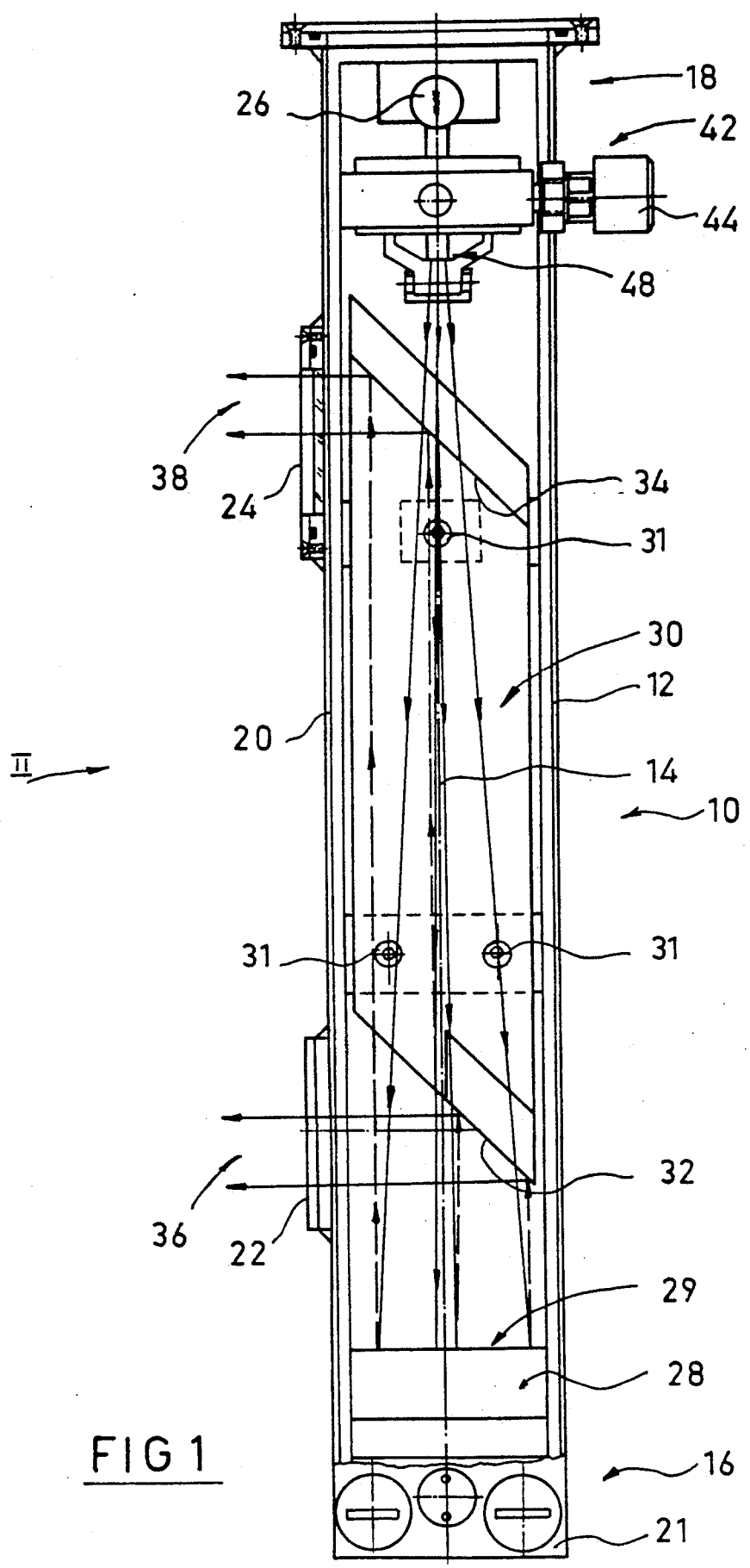
FIG. 1 is a cut-away side-view illustration of a boresight module, constructed and operative in accordance with a preferred embodiment of the present invention.
Figure 2:
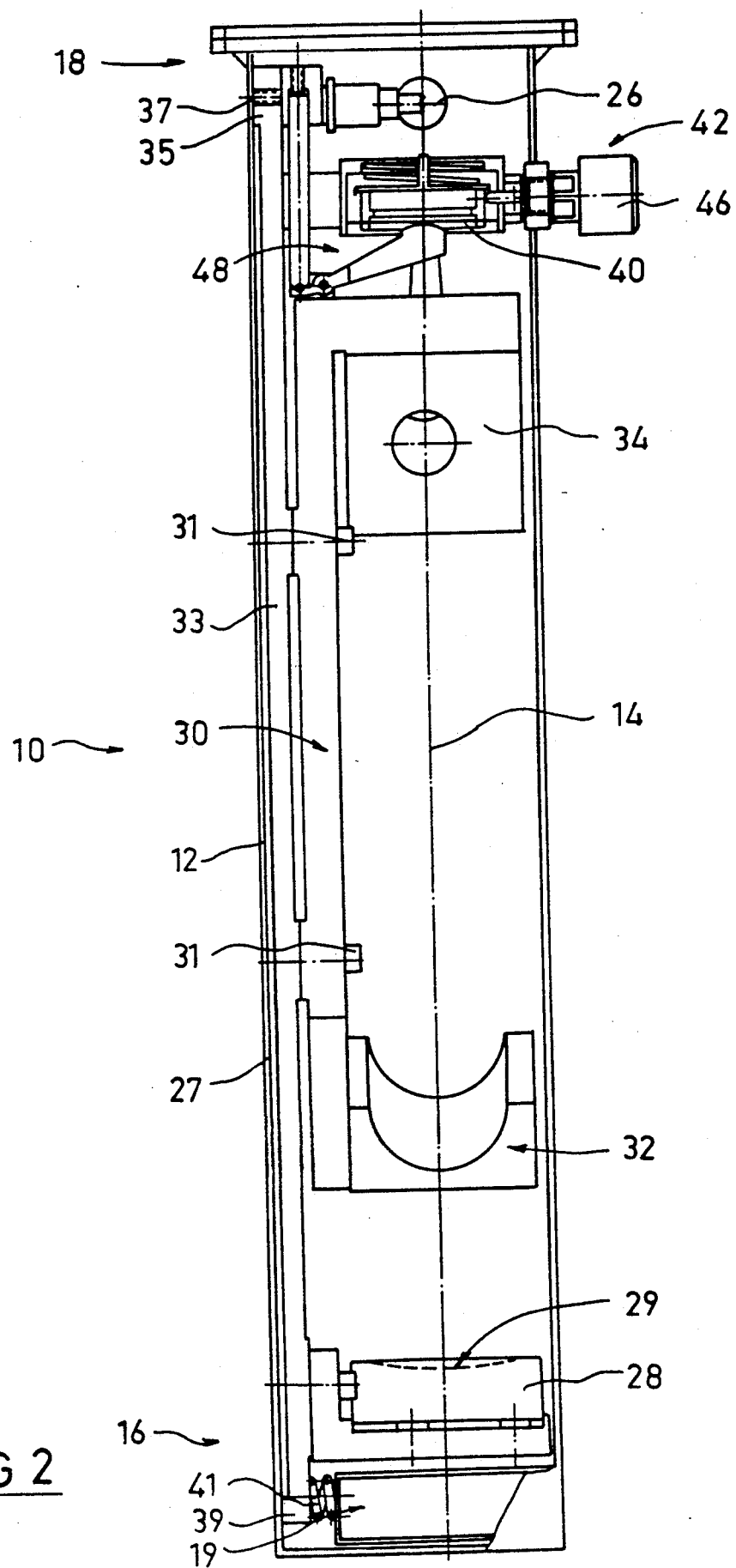
FIG. 2 is a cut-away side-view of the boresight module of FIG. 1, taken at right angles to the view of FIG. 1 and in the direction of arrow II therein.

Referring to FIGS. 1 and 2, there is shown a boresight module, referenced generally 10, constructed and operative in accordance with a preferred embodiment of the invention. Boresight module 10 comprises a housing, referenced 12, typically made from aluminum and defining an optical axis 14 passing through first and second ends of the housing, respectively referenced 16 and 18.

The housing further defines, in a wall 20, a 'day' optical window 22, located nearer to first end 16 and a 'night' optical window 24, located nearer to second end 18. A source 26 of, preferably, visible radiation, which may be an incandescent light bulb or a light emitting diode, is housed adjacent to second end 18 and is typically powered by a power source 19 located in a housing 21 at first end 16. A beam collimator 28, housed adjacent to first end 16 and a radiation source 26 are both centered along optical axis 14. Collimator 28 is mounted onto a wall 27 (FIG. 2) of housing 12 by means of a support member 33 (FIG. 2).

Although the beam collimator, which comprises a diamond-machined surface 29, may be a spherical mirror, according to the shown embodiment it is a parabolic mirror, typically as manufactured by ARYT OPTRONICS INDUSTRIES LTD., P.O.B. 13147, Jerusalem 91131, Israel, as per their drawing No. D41901.

Shown generally by reference numeral 30 is an integral optical assembly made from a single block of aluminum and, according to the present embodiment of the invention, mounted onto support member 33 (FIG. 2), by means of screws 31. Support member 33 is mounted onto wall 27 (FIG. 2) of housing 12 at a first end 35 as by means of a screw 37. Wall 27 is generally at right angles to wall 20 (FIG. 1) in which optical windows 22 and 24 are provided. Support member 33 is retained in touching contact with wall 27 at a second end 39, by means of an energy absorbing member 41, such as a spring, which is wedged between power source housing 21 and member 33.

The way in which support member 33 is mounted, as described, gives a single degree of freedom of movement thereof in relation to housing 12 and ensures that any shock forces likely to be experienced by housing 12 are generally not passed on to the optical apparatus contained thereby.

It will be appreciated by those skilled in the art that, by manufacturing a totally integrated optical assembly 30 from a single material, differential thermal expansion within the assembly, which is major cause of line of sight error in prior art equipment, is substantially eliminated.

Optical assembly 30 defines first and second parallel planar mirrors, respectively shown by reference numerals 32 and 34. According to a preferred embodiment of the invention, assembly 30 is made entirely from aluminum A16061 as per U.S. Federal Specification AA and mirrors 32 and 34 are diamond machined and are treated by surface treatment T6 (also according to U.S. Federal Specification AA).

First and second mirrors 32 and 34 are oriented at 45 degrees relative to optical axis 14 and are disposed in registration with day and night optical windows 22 and 24 respectively. As shown, mirrors 32 and 34 are configured such that beams of radiation projected (as shown in FIG. 1) from source 26 towards collimator 28 do not impinge on them.

When the beams are, however, reflected by collimator 28 towards the second end 18 of housing 12, due to their parallel reflections and the configuration of mirrors 32 and 34, a first plurality of reflected beams, referenced 36, is deflected, typically, at right-angles, by first mirror 32 towards a direct-view optical telescope system (not shown) used for daytime viewing and a second plurality of reflected beams, referenced 38, is deflected, also, typically, at right-angles, by second mirror 34 towards a thermal imaging system used for nighttime viewing.

A reticle 40, comprising an assembly of movable cross hairs (FIG. 2) is mounted in a boresight knob assembly, referenced generally 42 and, by means of respective knobs 44 and 46 may be moved along x and y axes (shown in FIG. 2) so as to align the reticle with a corresponding reticle of the day sight (not shown). Once the reticle 40 has been aligned with the day sight reticle, adjustments may be made, by means of electro-optical equipment (not shown) associated with the night sight, to align a reticle (not shown) forming part of the night sight equipment with reticle 40 of module 10. There is also provided optical focusing apparatus 48 for moving reticle 40 along the optical axis 14.

It will be appreciated by persons skilled in the art, that the present invention is not limited by what has been shown and described hereinabove. The scope of the invention is limited, rather, solely by the claims, which follow.

What is claimed is:

1. A boresight module comprising:
   a housing defining an optical axis and having a day optical window and a night optical window;
   a source of sensible radiation located along said optical axis;
   a collimator mounted in association with said housing operative to receive beams of radiation emitted by said radiation source and to reflect said beams parallel to said optical axis; and an optical assembly formed of a single piece of material located within said housing and comprising first and second optical surfaces in respective optical association with said day and night optical windows and positioned so as to receive said reflected beams such that a first plurality of said beams is deflected by said first optical surface through said day optical window and a second plurality of said beams is deflected by said second optical surface through said night optical window.

2. A boresight module according to claim 1, and also including a reticle located along said optical axis and positioned such that said emitted radiation beams are projected therepast prior to being received by said collimator.

3. A boresight module according to claim 1, and wherein said optical assembly is made of a single piece of an aluminum alloy and said first and second optical surfaces comprise diamond-machined surfaces.

4. A boresight module according to claim 2, and wherein said optical assembly is made of a single piece of an aluminum alloy and said first and second optical surfaces comprise diamond-machined surfaces.

5. A boresight module according to claim 1, and wherein said collimator defines a focus coincident with said optical axis.

6. A boresight module according to claim 2, and wherein said collimator defines a focus coincident with said optical axis.

7. A boresight module according to claim 3, and wherein said collimator defines a focus coincident with said optical axis.

8. A boresight module according to claim 4, and wherein said collimator defines a focus coincident with said optical axis.

9. A boresight module according to claim 1, and wherein said collimator comprises a parabolic mirror.

10. A boresight module according to claim 1, and wherein said collimator comprises a spherical mirror.

11. A boresight module according to claim 9, and wherein said collimator has a diamond-machined optical surface.

12. A boresight module according to claim 10, and wherein said collimator has a diamond-machined optical surface.

13. A boresight module according to claim 1, and wherein said sensible radiation source comprises source of visible radiation.

14. A boresight module according to claim 13, and wherein said source of visible radiation comprises an incandescent light source.

15. A boresight module according to claim 13, and wherein said radiation source comprises a light emitting diode.

16. A boresight module according to claim 2, and wherein said reticle is mounted in a movable assembly.

17. A boresight module according to claim 2, and wherein said collimator and said integral optical assembly are mounted in association with an inward-facing portion of said housing, and said boresight module also includes energy absorbing means mounted in association with said inward-facing portion of said housing, so as to substantially absorb shock forces experienced thereby and thus to prevent the transmission of shock forces to said collimator, said integral optical assembly and said reticle.

18. An optical assembly suitable for use in a boresight module and being formed of a single piece of material and comprising first and second optical surfaces aligned along an optical axis such that of a number of sensible radiation beams projected thereat, a first plurality is deflected by said first optical surface and a second plurality is deflected by said second optical surface.

19. An optical assembly according to claim 18, and wherein said single piece of material is a single piece of an aluminum alloy and said first and second optical surfaces comprise diamond-machined surfaces.

* * * * *